United States Patent
Deutschle (12)

(10) Patent No.: US 9,451,737 B2
(45) Date of Patent: Sep. 27, 2016

(54) SOIL CULTIVATION DEVICE

(71) Applicant: Wiedenmann GmbH, Rammingen Krs. Ulm (DE)

(72) Inventor: Karl Deutschle, Blaustein (DE)

(73) Assignee: Wiedenmann GmbH, Rammingen Krs. Ulm (DE)

( * ) Notice: Subject to any disclaimer, the term of this patent is extended or adjusted under 35 U.S.C. 154(b) by 0 days.

(21) Appl. No.: 14/678,576

(22) Filed: Apr. 3, 2015

(65) Prior Publication Data

US 2015/0282419 A1  Oct. 8, 2015

(30) Foreign Application Priority Data

Apr. 4, 2014  (DE) ........................ 10 2014 104 876

(51) Int. Cl.
| | |
|---|---|
| *A01B 39/10* | (2006.01) |
| *A01B 63/00* | (2006.01) |
| *A01B 39/20* | (2006.01) |
| *A01B 76/00* | (2006.01) |
| *A01B 45/02* | (2006.01) |

(52) U.S. Cl.
CPC ............. *A01B 39/10* (2013.01); *A01B 39/20* (2013.01); *A01B 45/023* (2013.01); *A01B 63/002* (2013.01); *A01B 76/00* (2013.01)

(58) Field of Classification Search
CPC ...... A01B 39/10; A01B 39/20; A01B 45/02; A01B 45/023; A01B 63/00; A01B 76/00
USPC ............................. 172/21, 59, 101
See application file for complete search history.

(56) References Cited

U.S. PATENT DOCUMENTS

| | | | | |
|---|---|---|---|---|
| 3,057,412 A * | 10/1962 | Hovis, Jr. | ............... | A01B 39/10 172/42 |
| 5,709,272 A * | 1/1998 | Jones | ................... | A01B 45/023 172/101 |
| 5,797,458 A * | 8/1998 | Simon | .................. | A01B 45/023 172/2 |
| 5,988,290 A * | 11/1999 | Banks | .................. | A01B 45/023 172/101 |
| 6,561,282 B2 * | 5/2003 | Smith | .................. | A01B 45/023 172/101 |
| 6,948,568 B2 * | 9/2005 | Banks | .................. | A01B 45/023 172/21 |
| 8,291,992 B2 * | 10/2012 | de Bree | ............... | A01B 45/023 172/21 |
| 8,376,062 B2 | 2/2013 | Wiedenmann | | |
| 2015/0296696 A1 * | 10/2015 | De Bree | ............... | F16F 3/0873 172/21 |

FOREIGN PATENT DOCUMENTS

| | | |
|---|---|---|
| DE | 10 2005 021 025 B4 | 2/2012 |
| DE | 20 2012 010 495 U1 | 3/2014 |
| WO | 2014068127 A1 | 5/2014 |

* cited by examiner

Primary Examiner — Gary Hartmann
(74) Attorney, Agent, or Firm — Global IP Counselors, LLP

(57) ABSTRACT

A soil cultivation device, which is movable relative to the soil in a direction of movement, for the deep loosening of soils, comprises perforating tools guided on supporting arms that move up and down, and a damping device having an elastomeric body, for damping a returning movement of the perforating tools pivoting relative to the supporting arm during withdrawal from the soil. For smoother and faster operation, a first side of the elastomeric body is firmly connected to a retaining member, resting flat on a retaining surface of the retaining member, and a second side of the elastomeric body opposite the first side is firmly connected to an input member in a firmly attached manner, resting flat on a retaining surface of the input member, and the body of elastomeric material is elastically biased by a separate biasing device acting against the body.

20 Claims, 4 Drawing Sheets

SOIL CULTIVATION DEVICE

CROSS-REFERENCE TO RELATED APPLICATION

This application claims priority under 35 U.S.C. §119(a) to German Patent Application No. 10 2014 104 876.8, filed on Apr. 4, 2014, the entire contents of German Patent Application No. 10 2014 104 876.8 are hereby incorporated herein by reference.

BACKGROUND

1. Field of the Invention

The invention relates to a soil cultivation device, which is movable relative to the soil in a direction of movement, for the deep loosening of soils.

2. Background Information

A soil cultivation device as described in DE 10 2005 021 025 B4 has a device chassis or device frame. Further, a series of supporting arms is provided that are hinged with a first end portion to the device chassis or the device frame in such a way that they can be pivoted up and down about a stationary first pivoting axis. A driving mechanism, for example a crank drive, is provided for driving the up-and-down movement of the supporting arms. For each supporting arm, there is at least one perforating tool hinging device, respectively, with which the perforating tool is hinged to a second end portion of the associated supporting arm so as to be pivotable about a second pivoting axis. This is done in such a way that a perforating tool attached to the perforating tool hinging device can be driven into the soil when moving the associated supporting arm downwards. If the soil cultivation device then travels on in the direction of movement, the driven-in tool is pivoted about the second pivoting axis so that a deep loosening of the soil underneath the soil surface takes place. Because of the continued driving action of the driving mechanism, the supporting arm is lifted again and the perforating tool is withdrawn from the soil, with the perforating tool then being returned to its rest position.

In order to be able to make soil cultivation particularly quick and safe, DE 10 2005 021 025 B4 provides that the pivoting movement of the perforating tool hinging device about the second pivoting axis is transmitted by means of a gearing mechanism onto a damping device for damping. According to FIG. 5 and FIG. 6 of DE 10 2005 021 025 B4, a so-called "Rosta" member is provided as a damping device, which has an outer housing attached to the device frame and has a square shaft connected to the gearing mechanism and inserted into the housing. Four bodies of an elastomeric material are fitted between the housing, which is provided with a square cross section on the inside, and the square shaft contour with a square cross section, which are subjected to pressure between an edge of the square shaft and an inner surface of the housing only when the square shaft is rotated. Tests have shown that, in case of a particularly high working speed, it becomes difficult to bring about an effective damping action with such Rosta members.

SUMMARY

It is an object of the invention to improve a soil cultivation device of the type specified in the preamble and known in principle from DE 10 2005 021 025 B4 in such a way that higher working speeds with, at the same time, smoother running are made possible.

In order to achieve this object, the invention provides a soil cultivation device according to the disclosed embodiments.

The disclosed embodiments provide a soil cultivation device, which is movable relative to the soil in a direction of movement, for the deep loosening of soils, comprising a device chassis or device frame, at least one supporting arm hinged with a first portion to the device chassis or the device frame so as to be pivotable up and down about a first pivoting axis that is stationary relative to the device chassis or device frame, a driving mechanism for driving the up-and-down movement of the at least one supporting arm, at least one perforating tool hinging device, respectively, per supporting arm, by means of which the at least one perforating tool can be hinged, so as to be pivotable relative to the associated supporting arm about a second pivoting axis, to a second portion of the supporting arm in such a way that the perforating tool can be driven into the soil when moving the supporting arm downwards and that the perforating tool hinging device is pivoted relative to the supporting arm and the soil at least when the perforating tool has been driven in and during further movement of the soil cultivation device in the direction of movement, so that the soil can be loosened underneath the soil surface, and at least one gearing mechanism interposed between the perforating tool hinging device and a damping device in order to at least partially dampen the relative movement between the perforating tool hinging device and the associated supporting arm. The damping device has an elastomeric body of an elastomeric material fitted between a retaining member for attaching the damping device and an input member connected to the gearing mechanism, so that, when a movement is initiated by the gearing mechanism, the retaining member and the input member are able to move while the elastomeric body is being deformed for damping.

Furthermore, the soil cultivation device can include at least one of the following characteristics:

a first side of the elastomeric body connected to the retaining member in a firmly attached manner, resting flat on a retaining surface of the retaining member, and that a second side of the elastomeric body opposite the first side is connected to the input member in a firmly attached manner, resting flat on a retaining surface of the input member; and the body of elastomeric material is elastically biased by means of a separate biasing member acting against the body.

Preferably, the elastomeric body is a massive body consisting of the elastomeric material. It is also preferred that a first surface region of the elastomeric body disposed on a first side of the elastomeric body is connected in an attached manner, firmly and unmovably relative to the retaining member, to a retaining surface of the retaining member, and that a second surface region of the elastomeric body disposed on a second side of the elastomeric body opposite the first side is connected in an attached manner, firmly and unmovably relative to the input member, to a retaining surface of the input member. It is also preferred that the surface of the first side is attached in an adhering manner, resting flat against the retaining surface of the retaining member, and that the surface of the second side is attached in an adhering manner, resting flat against the retaining surface of the input member.

It is further preferred that the retaining member has a retaining plate or a retaining rail, that the input member has an input plate or an input rail, and that the body is fitted between the retaining plate or retaining rail on the one hand, and between the input plate or input rail on the other hand. The gearing mechanism can be connected to the input member in such a way and the retaining member is attached in such a way that the input member and the retaining member rotate relative to one another about an axis of rotation extending through the body when the perforating tool hinging device is pivoted about the second pivoting axis. The axis of rotation can extend parallel to at least one of the retaining surfaces with at least one directional component.

It is also preferred that the first side rests with its entire surface on the retaining member and is connected over its entire surface to the retaining member. It is preferred that the second side rests with its entire surface on the input member and is connected over its entire surface to the input member. The retaining member can be attached in a stationary manner relative to the device chassis or the device frame. Also, the body can be configured in a cuboid shape.

It is further preferred that several perforating tool hinging devices are provided that are connected by means of associated gearing mechanisms to respectively associated input members of a common damping device, the damping device having a common retaining member and one or more common elastomeric bodies via which the several input members are connected to the common retaining member. The gearing mechanism can be a linkage system with a control rod hinged in an articulated manner to the perforating tool hinging device with a first hinging point. It is preferred that the linkage system further has, as a deflection member, a control lever, which is hinged in an articulated manner to the control rod at a second hinging point and is connected to the input member or acts as an input member.

The control lever can be attached in an elastically movable manner to the device chassis or the device frame by means of the elastomeric body. It is preferred that the retaining member is a control lever base, which is attached to the device frame or the device chassis, and which is attached via the elastomeric body to the control lever in an elastically movable manner, and in particular in an elastically rotatable manner about an axis of rotation extending through the elastomeric body. Preferably, the control rod is connected on one end to the perforating tool hinging device in an articulated manner, and on the other end to the control lever in an articulated manner. The control lever preferably has a first arm which is firmly connected to the input member for joint movement or forms the input member.

The control lever can be rotatable about the axis of rotation extending within the body, while the body is being deformed. It is preferred that the control lever rests against a stop when the perforating tool has not been driven in. The control lever can have a second arm which rests against the stop when the perforating tool has not been driven in. The stop can be adjustable and/or that the stop serves as the biasing member.

It is also preferred that a series of supporting arm with at least one associated penetration tool hinging device each and at least one control rod each is provided, wherein several or all of the control rods are centrally adjustable in order to adjust a penetration angle. At least one control rod can be rigid in operation. It is preferred that, however, the length of the at least one control rod, when not in operation, can be adjusted and fixed for adjusting a penetration angle.

In order to achieve higher working speeds, two alternative solutions are provided according to the invention, which can be present alternatively or cumulatively.

According to a first alternative, it is provided that a retaining member is firmly and unmovably connected to the body on a first side of the elastomeric body, and that an input member is firmly and unmovably connected to the body on a second side of the elastomeric body opposite the first side. This is preferably done in such a way that the retaining member acts exclusively on the first side and the input member exclusively on the opposite second side. Further, this is preferably done in such a way that the input member is connected to the retaining member exclusively via the body, and is thus attached so as to be elastically rotatable about an axis of rotation extending through the elastomeric material of the body while twisting the body.

In the case of the prior-art Rosta members, elastomeric bodies at first act only in a point-shaped (or line-shaped) manner and are compressed further and further on all four sides of the square shaft when the square shaft is rotated further. This results in a non-linear, very steep characteristic curve; the bodies become very rigid within an extremely short time and offer very high resistance. It was found in practice that, on the one hand, only a very poor damping action can thus be obtained, and that this results in the returned penetration tools swinging too much while being returned and in the transfer of the perforating tools back into their rest position taking too long. This limits the possible transport speeds and affects the quality of the hole formations.

In contrast, in the preferred embodiment of the invention, the body is twisted in itself as a whole; this results in an advantageous characteristic curve very well-suited for damping.

Alternatively, it is provided that the body of elastomeric material is elastically biased by means of a separate biasing member acting against the body.

Tests with the prior-art Rosta member have shown that it is difficult to bring about a return of the perforating tools with a simple Rosta member. In the zero position, the Rosta member provides no restoring forces on the input shaft; the restoring forces only start to act when the input shaft is rotated and then increase very steeply. The result of this, however, is that no restoring force at all acts close to the zero position, especially, so that the perforating tools can hardly be kept still in the zero position. If, in contrast, the Rosta member is already biased, the rest position of the perforating tool is situated outside the zero position of the damping device, and thus, restoring forces are already acting due to a Rosta member even in the correspondingly biased rest position; any rotation in the two directions takes place against an already acting damping force. An improved damping action is thus attainable, whereby the transport speeds can be increased.

The idea of the biasing thus already improves the damping effect in the case of use of known damping devices, such as Rosta members, for example. Particularly preferably, the two ideas of, on the one hand, the elastic biasing, and of the (preferably full-surface) action of the retaining member and the input member on opposite sides of the elastomeric body are combined with one another. Preferably, only a single body of elastomeric material is provided per input member—in contrast to the Rosta member—with the input member acting only on the second side and the retaining member being attached only to the opposite first side.

This idea also has an effect in damping devices that are moved up and down with the supporting arm; it would thus be conceivable to attach a corresponding damping device to the supporting arm so as to move with it; such a configuration is expressly included herein.

Particularly preferably, the damping device is attached to the retaining member, but in a stationary manner relative to the device frame or device chassis, wherein the gearing mechanism of the type known from DE 10 2005 021 025 B4 serves for transferring the pivoting movement of the penetration tool relative to the second pivoting axis from the moving system into the unmoving system. For more details regarding the possible structure of such a gearing mechanism, reference is made to 10 2005 021 025 B4.

Accordingly, also in the case of the present soil cultivation device, it must preferably be provided to arrange a damping and stop member outside the moving system. However, whereas, in the earlier solution according to 10 2005 021 025 B4, a Rosta member has been used which comprises a rectangular sleeve with rubber members, with a square member being guided within the rubber members, the preferred solution provides an action between the retaining member and the input member only on two opposite sides of a body of elastomeric material.

Preferably, two metal strips are used, with a rubber body therebetween. Preferably, the one metal strip acting as a retaining member is attached to the frame or the chassis. The other metal strip acting as an input member is guided via a control lever or the like on an axis of a control rod which is part of the gearing mechanism. The axis of the control rod is located close to the pivoting axis of the supporting arm. The position of the axis between the control lever and the control rod can be moved about an imaginary axis situated within the body by twisting the body of elastomeric material. Thus, the pivoting movement of the perforating tool—for example a prong—can be absorbed. This pivoting movement is elastically damped. Therefore, separate springs are no longer required.

A possible larger mass and a larger volume of the elastic material, which is possible in this solution as compared with, for example, Rosta members, in particular results in a better transmission of forces. A better transmission of forces results particularly if the force is transmitted via a larger surface from the body onto the retaining member and/or the input member. The improved transmission of forces also results in a greater durability.

In another possible solution, the entire damping device could in turn be embedded in a rubber mass in order to improve durability.

There are various possible embodiments. In one embodiment, a central retaining plate or retaining strip is provided on which the body is attached with its first side. On the opposite second side of the body, several single plates are then provided on the other side, which can be connected as individual input members to the gearing mechanisms associated with the various supporting arms, so that several tool holders can be connected.

In another embodiment, a single rubber member is provided between a single retaining plate and a single input plate.

In yet another embodiment, several rubber buffers are provided as bodies. One configuration of this embodiment with several rubber bodies is such, for example, that several rubber bodies are inserted between an input plate or input strip and a retaining plate or retaining strip. By means of a varying selection of the rubber bodies—e.g. volume, mass, material, Shore hardness, shape—a very defined characteristic property of the damping device can be set.

Moreover, a plurality of rubber bodies can be provided side-by-side on a single retaining plate, with one input plate, respectively, for connecting a perforating tool hinging device being provided on one or more of these rubber bodies. Preferably, a block strip of an elastomeric material, which extends in an elongate manner in the direction of the axis of rotation, is provided as a body. Alternatively, a row of bodies of elastomeric material situated side-by-side is provided, wherein the row also preferably extends in the direction of the axis of rotation.

If several individual plates are provided as input members, elastic members can also be specifically fitted between the input plates in order to provide for a mutual stabilization; for example, an elastomeric material could also be fitted between two adjacent input members that couples the adjacent input members to each other elastically. Mechanical springs—helical spring members, leaf spring members or the like—are also conceivable.

The advantages of special embodiments of the invention are that it is possible to drive at much higher speeds with the new damping devices. Another result is, in particular, that a greater variation of possible settings is available with the new damping device. A relatively large amount of variance can be obtained through the selection of the elastomeric bodies, particularly via the selection of material—different rubber mixtures. A great level of vibration damping is provided by the use of elastomeric material. All this increases the options compared with the known Rosta member. In the case of a Rosta member, the rubber members at first rest in contact in a point-shaped manner, and a greater degree of twisting results in a much larger restoring force.

Two surfaces rest in contact in the newly developed damping device. Moreover, there is no housing that stands in the way of the deformation path of the elastomeric body. On the whole, progressivity is not so large.

Alternatively or additionally, there is the option of biasing the rubber member in order to better predetermine the working range. In principle, the option of biasing is interesting also in the case of using a Rosta member. However, the progressivity in the case of a Rosta member results in an increased tendency that the hole that is being driven in deforms into an elongated hole, even if a separate biasing is used. If a rubber body is used which is handled by opposite sides but which can otherwise be bent freely, the result tends to be a round shape of hole.

Another advantage is the improved geometry of the entry point for the gearing mechanism and the retaining member. In the case of a Rosta member, the entry point of the gearing mechanism is inevitably laterally offset from the sleeve-shaped retaining member. This also results in problems due to introduced torques that arise due to the lateral offset. However, in the case of the solution with the action on two different opposite sides, it is possible to put load on the rubber body centrally; no undesired torques arise; and the assembly can be kept more compact as a whole. Thus, the geometry is advantageous; here, the attachment can take place on one side and the action on the gearing mechanism on the other side. This results in a more compact construction, viewed in the lateral direction. On the whole, the load can be better distributed onto the elastomeric material so that durability increases.

Also, several damping devices can be accommodated in a smaller space. The biasing member can also be accommodated easily. A predetermination and positioning of a penetration angle can also be accommodated in a small space.

Therefore, a biasing is particularly advantageous because the body of elastomeric material does not exert any force in the zero position. The risk of a vibration then arises around the zero position. However, if one works in the biased state, one works on a linear or substantially linear characteristic curve, so that good damping effects are provided there.

Biasing can take place by means of a biasing member that biases in a certain angle the control lever inserted between the control rod and the body of elastomeric material. A stop, for example, may be provided for this purpose. In one embodiment, the stop is provided on a second arm of a control lever configured as a two-armed lever. It is of course also conceivable that the control lever acts as a one-armed lever, with the stop acting between the body of elastomeric material and the control rod joint.

Preferably, the stop is adjustable; the setting of the biasing results from the positional setting of the stop. Also, the stop can have a buffer or other elastic member, so that an elastic bias is provided.

Another advantage is that the damping device leads to an excellent protection against driving backwards. When driving backwards while the tools are still driven in, a slow resistance is built up which can be easily noticed by the operator, for example, or which can be handled by corresponding automatic means.

It is preferred that the retaining member and the input member are connected to each other only via the body of elastomeric material. This is preferably done in such a way that the retaining member and the input member are elastically movable relative to each other.

As compared with Rosta members, this results in better centering and transmission of forces due to a larger base of the new rubber member. A central damper rail is possibly provided, to which several individual input members are elastically attached over at least one body of elastomeric material. Single versions with an additional rubber casing are also possible.

A higher speed of a crank drive as a drive unit is possible with preferred embodiments; depending on the configuration, a slightly uncontrolled movement may possibly result at lower speeds. Depending on the choice of rubber body, different characteristics can be obtained in order to optimize the soil cultivation device for the desired working speed range.

For example, the soil cultivation device could have a modular configuration, with different drive units being available for different sizes or speeds. Depending on the drive unit, different bodies, e.g. with different Shore hardnesses, or different spring damping members may possibly have to be used.

While a point-shaped contact is provided at the beginning and an increasing progression can be registered as the deflection increases (exponential increase of forces) in the case of the Rosta member, a more linear force is obtained right from the beginning in the preferred new damping member. A protection against driving backwards is also provided due to the rubber members.

The modified configuration of the damping device affects the hole pattern of the perforating tool when perforating the soil; the use of Rosta member tends to result in an elongated hole; if preferred embodiments of damping devices are used, the holes are more defined and rounder.

The rubber member is preferably biased in order to avoid a neutral position, in which no resulting force of the rubber member is present, in operation. Depending on the working speed, a neutral position without a restoring force could lead to rather undesirable movements of the perforating tools in the home position; this can be avoided by biasing.

If necessary, a biasing is to be provided by means of a stop; alternatively, the retaining member could also be pivoted to a correspondingly greater extent in the rest position so that the body of elastomeric material is biased already in the rest position. Preferably, the stop and/or the retaining member are configured to be adjustable.

A central angle adjustment, by means of which a penetration angle can be set simultaneously for several perforating tools, could be carried out via a common central basis for all damping devices of the respective perforating tool units. For example, a retaining strip is provided as a common basis which is adjustable in a linear and/or rotatable manner.

An individual adjustment of the penetration angle is possible for example via an adjustment of the length of a gearing mechanism member, in particular a control rod. Preferably, the gearing mechanism is provided with a control rod which, together with the perforating tool hinging device and the supporting arm, forms a parallelogram linkage. The control rod is hinge-mounted on the side of the device in an elastic manner by attaching the input member by means of the body of elastomeric material to the retaining member, which in turn can be attached so as to be stationary on the frame.

Preferably, the soil cultivation device is provided with a rubber rail prong control unit. A smoother running and a higher productivity can thus be obtained. It is also preferred that a prong support (an example for the perforating tool hinging device) disposed rotatably on the supporting arm (also referred to as rocker) is connected, via a parallelogram-like control rod disposed to the rocker, to a control lever which is mounted on the device frame in a biased, pivotable, elastic and/or vibration-damping manner. By means of the biased, pivotable, elastic and/or vibration-damping mounting of the control lever, the pivoting movement of the perforating tool hinging device relative to the supporting arm is controlled, positioned and/or returned. Preferably, the control lever is mounted in the elastic rotation axis region and is biased.

Preferably, one or several rubber buffers forming the rotation axis are provided on the control lever. Instead of a bearing, mounting takes place via the rubber buffer. A rubber rail with a broad base, which forms the rotation axis, is provided on the control lever. A rubber rail can be taken into consideration for individual or unilaterally connected input members, for example.

Another adjustable elastic buffer, which biases and fixes the control lever adjustably, is preferably provided on the base for the control lever. The control lever base is preferably disposed rigidly or adjustably on the device frame. Preferably, two or more of the control levers of all perforating tool units—e.g. from a series of supporting arm provided with respective perforating tool units—are centrally adjustable. Optionally, the control rod is length-adjustable.

DESCRIPTION OF THE DRAWINGS

Exemplary embodiments of the invention will be explained below in more detail with reference to the attached drawings, in which.

DETAILED DESCRIPTION OF EMBODIMENTS

Figure 1:
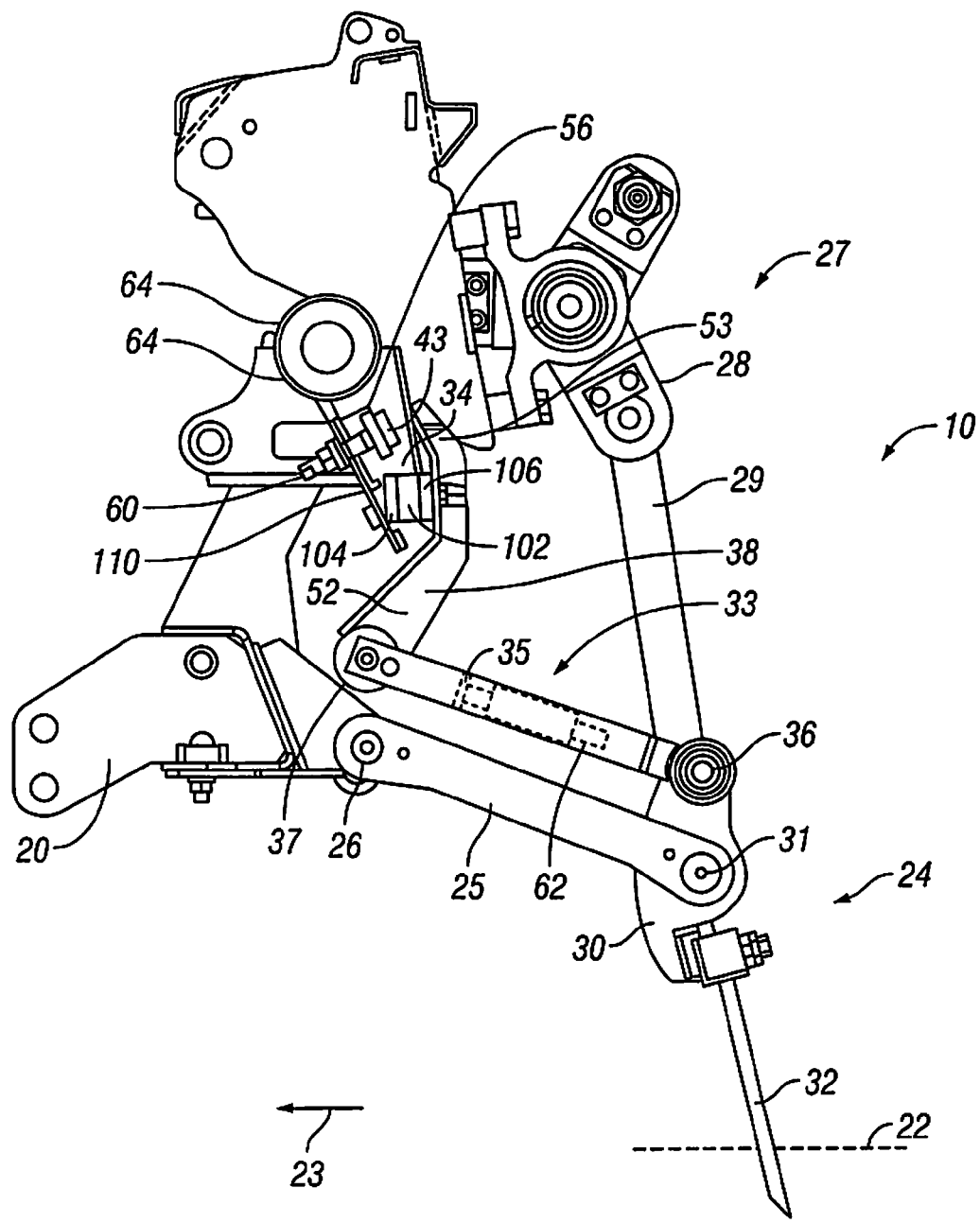
FIG. 1 shows a side view of an example of an embodiment of a soil cultivation device for the deep loosening of soils, with a part of the device frame and with tool units with driven supporting arms that can be moved up and down and perforating tool hinging device hinged thereto.
Figure 2:
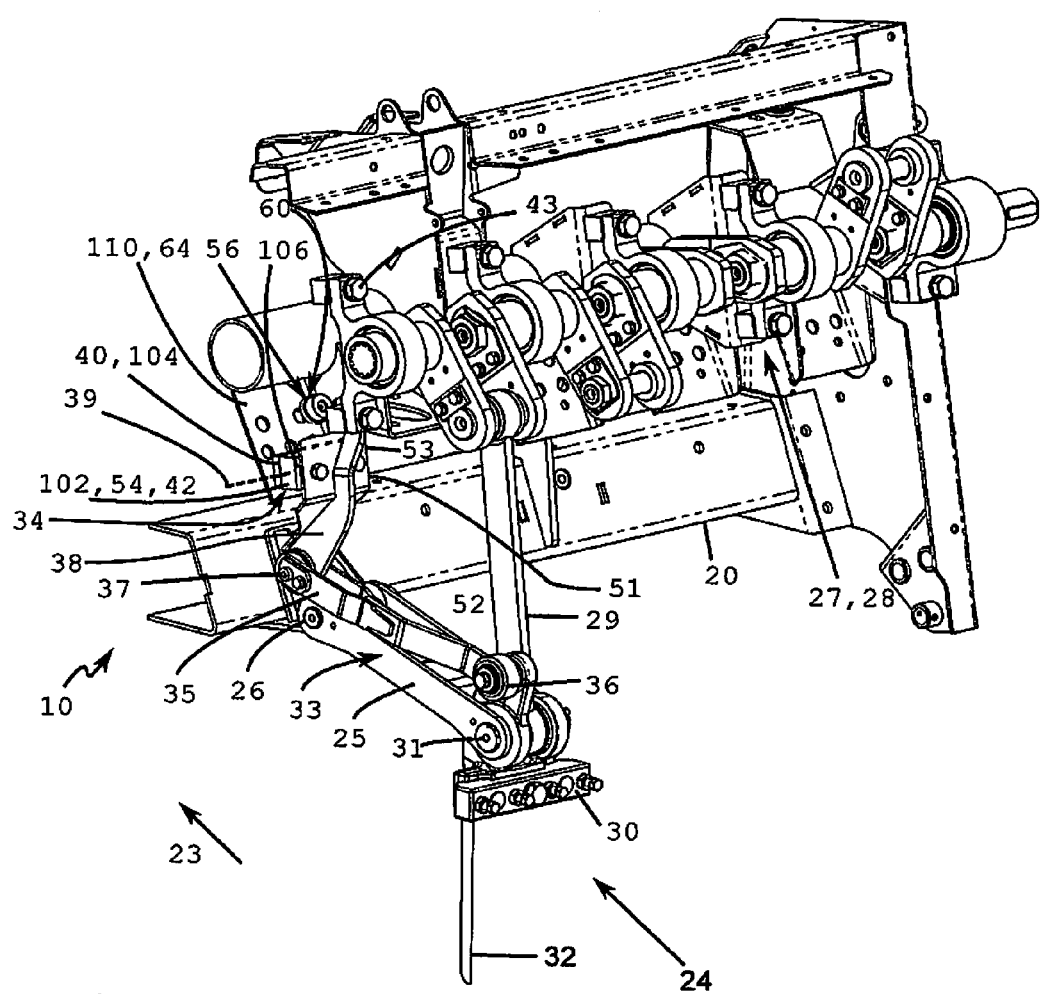
FIG. 2 shows a first perspective view of components of the device of FIG. 1.
Figure 3:
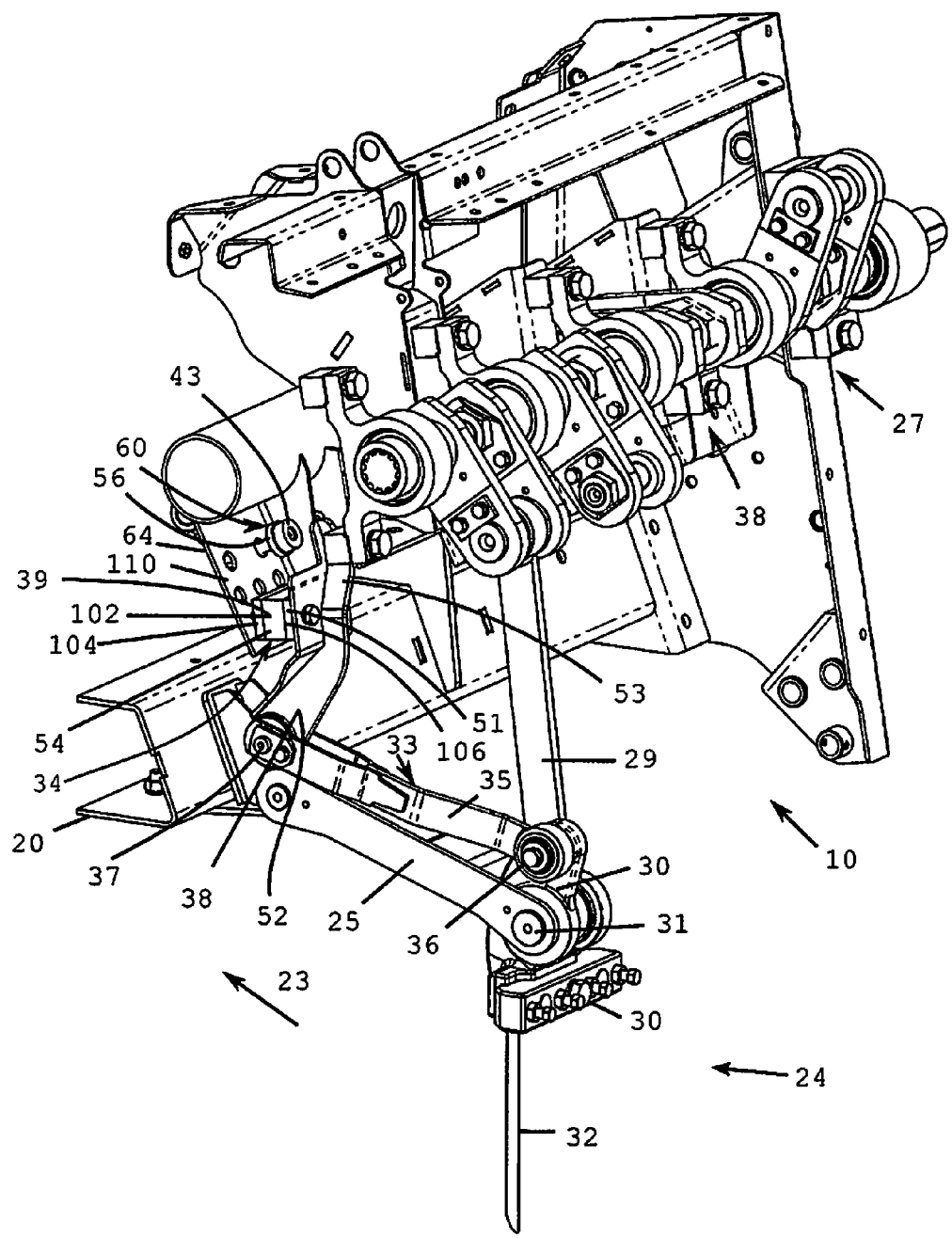
FIG. 3 shows a second perspective view of components of the device.

FIGS. 1 to 3 each show different views of an embodiment of a soil cultivation device 10 for the deep loosening of soils.

In this case, further typical components of such devices well-known in the prior art—see, for example, the documents cited in the introduction to the description of DE 10 2005 021 025 B4—are omitted for greater clarity. As a rule, the soil cultivation devices discussed herein have a plurality of tool units that are disposed on the soil cultivation device 10 distributed transversely to the direction of travel. A perspective view of such a distribution is presented, for example, in the German patent application DE 10 2004 018 101 A1, to which express reference is made for further details of the soil cultivation devices discussed herein. For further details, additional reference is made to DE 10 2005 021 025 B4 and the documents cited therein.

The soil cultivation device 10 has a device frame 20 that can be moved over the soil 22 in a direction of movement 23 by means of rollers (not shown). Several identically configured tool units 24 are provided side-by-side, in the direction into the plane of illustration of FIG. 1, only one of which, respectively, is shown in the Figures. Each tool unit 24 has a rocker or a supporting arm 25—this may be a rod, for example; preferably, however, each supporting arm 25 is formed by several parallel rods that are coupled, for example welded, to each other. On one end, the supporting arm 25 is indirectly or directly hinged to the device frame 20, pivotably about a first pivoting axis 26, in such a way that the first pivoting axis 26 is stationary 26 relative to the device frame 20.

A driving mechanism 27 with a crank drive 28 and a drive rod 29, which drives the supporting arm 25 to pivot up and down about the first pivoting axis 26, acts on the supporting arm 25. A perforating tool hinging device in the form of a tool holder 30 is hinged to the free end of the supporting arm 25 so as to be pivotable relative to the supporting arm 25 about a second pivoting axis 31. Accordingly, the second pivoting axis 31 and the tool holder 30 move up and down together with the supporting arm 25. A perforating tool 32 for perforating the soil 22 is firmly, but replaceably, attached to the tool holder 30.

In the exemplary embodiment of the soil cultivation device 10 shown, a gearing mechanism, here in the form of a first linkage system 33, is provided, which guides a relative pivoting movement of the supporting arm 25 and the tool holder 30 in the vicinity of the first pivoting axis 26 for being tapped at that location by means of a damping device 34 disposed at rest relative to the device frame 20. The linkage system 33 respectively comprises one rigid rod member, in this case in the form of an approximately straight control rod 35, which is rigid in operation, which in this case means not length-adjustable particularly during operation, with a first hinging point 36 and a second hinging point 37 spaced therefrom in the longitudinal direction of the control rod 35.

With its first hinging point 36 located at one end, the control rod 35 is firmly but pivotably hinged to the tool holder 30. The pivoting axis, which extends through the first hinging point 36 (into the drawing plane) and about which the control rod 35 is able to pivot relative to the tool holder 30, is spaced from and parallel to the second pivoting axis 31. The control rod 35 extends approximately parallel to the supporting arm 25, and the spacing of the hinging points 36, 37 approximately corresponds to the spacing between the first pivoting axis 26 and the second pivoting axis 31. Therefore, the location of the second hinging point 37 relative to the first pivoting axis 26 corresponds to the location of the first hinging point 36 relative to the second pivoting axis 31. In other words, the hinging points 36, 37 and the first and second pivoting axes 26, 31 at least approximately form a parallelogram.

In the exemplary embodiment of the soil cultivation device 10 shown, the gearing mechanism formed by the first linkage system 33 further comprises a control lever 38 mounted to the device frame 20 so as to be rotatable about an axis of rotation 39. For this purpose, the control lever 38 acts on the damping device 34.

In the embodiment of a soil cultivation device 10 shown, the control lever 38 is thus mounted in an elastically pivoting manner. The control lever 38 is connected in a pivoting manner to the device frame 20 via an elastomer 54. While the perforating tool 32 has not been driven in, the elastomer 54 retains the control lever 38 in the rest position and lets the control lever 38 pivot in both directions about the third pivoting axis 39 to a certain extent. This takes place, for example, during every pivoting of the tool holder 30 about the second pivoting axis 31 that occurs during the perforating operation. When the perforating tool 32 is released, the elastomer 54 pulls the control lever 38, and thus the tool holder 30, back into the rest position.

This is effected by means of the damping device 34. The damping device 34 has an elastomeric body 102 of an elastomer 54, the body 102 being fitted between a retaining member 104 and an input member 106, so that the retaining member 104 is connected to the input member 106 exclusively via the body 102.

Figure 5:
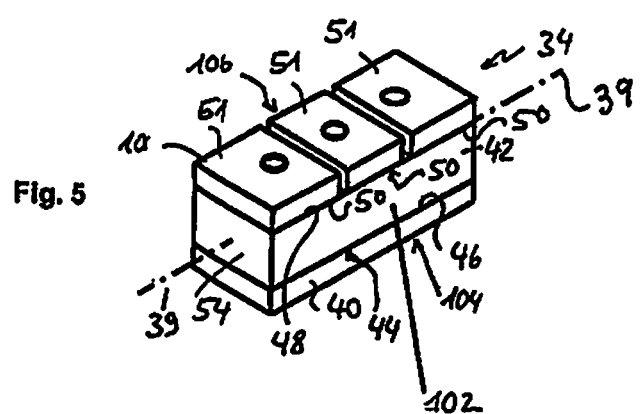
FIG. 5 shows a perspective view of a second embodiment of a damping device for the soil cultivation device.
Figure 4:
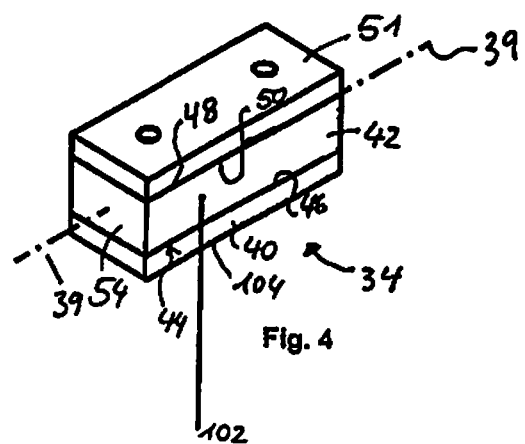
FIG. 4 shows a first embodiment of a damping device for the soil cultivation device.

Exemplary embodiments of the damping device 34 are shown in more detail in FIGS. 4 and 5. According to them, the retaining member 104 is a retaining plate 40 of a retaining rail, for example. The body 102 is, in particular, an elongated cuboid block 42 consisting of a massive elastomer 54.

A first side 44 of the body is connected to a retaining surface 46 of the retaining member 104 so as to adhere thereto over its entire surface, in particular connected thereto by vulcanization or glued thereto. On the opposite second side 48 of the body 102, a retaining surface 50 of the input member 106 is connected to at least a portion of the second side 48 so as to adhere thereto over its entire surface, e.g. connected thereto by vulcanization or glued thereto. The remaining sides of the body 102 are exposed, so that the body 102 is able to deform towards these sides. A preferred deformation direction about the imaginary axis of rotation 39 extending through the elastomer 54 of the body 102 can be predefined by an elongated shape. Accordingly, the axis of rotation 39 extends in the longitudinal direction of the block 42.

The body 102 can be formed by a rubber strip, for example; in that case, the axis of rotation 39 extends in the longitudinal direction of the rubber strip. In an embodiment not shown, a row of single rubber bodies or single blocks disposed side-by-side is provided. In that case, the axis of rotation 39 preferably extends in the longitudinal direction of the row.

The two embodiments shown in FIGS. 4 and 5 differ in the arrangement of the input member 106. Whereas only a single input member 106 configured as a strip or input plate 51 is provided in the embodiment shown in FIG. 4, several plate-shaped input members 106 are attached side-by-side on an elastomeric body 102 configured as a rubber strip and can also be moved relative to one another to a certain extent in the further embodiment shown in FIG. 5. Several linkage systems 33, e.g. those of adjacent tool units 24, can be connected to the several input members 106.

As is shown in FIGS. 1 to 3, the input member 106 is, in particular, a part of the control lever 38. In the exemplary embodiments shown, the control lever 38 is configured as a two-armed lever, with a first arm 52 being hinged to the control rod 35 in the second hinging point 37. A second arm 53 cooperates with a stop 56 whose position is adjustable and which is provided on its stop surface with an elastic buffer 43.

In the central region between the arms 52, 53, the control lever 38 is provided with a plate-shaped portion forming the input member 106, or is firmly attached to the input member 106 configured as an input plate 51. A rotation of the control lever 38 takes place while the elastomeric body 102 is being deformed about the axis of rotation 39.

The stop 56 defining the rest position is set in such a way that it already biases the elastomeric body 102 from its zero position into a deformation direction. Thus, an elastic restoring force acts already in the zero position. The stop 56 with the buffer 43 and the second arm 53 thus form a biasing device 60 for elastically biasing the damping device 34. Of course, other biasing devices 60 are also conceivable. For example, the control lever 38 can also be configured as a one-armed lever; the stop would then act on the first arm 52.

Accordingly, the control lever 38 is elastically connected to the retaining member 104 via the body 102. Preferably, the retaining member 104 is attached to the device frame 20. Thus, the retaining member 102 also serves as a control lever base 110 of an elastically mounted control lever 38.

In the first embodiment of the damping device 34 shown in FIG. 4, the retaining member 104 is configured as a control lever base 110 in the form of an elongated plate or rail which—adjustable in its position or orientation, for example—is retained on the device frame 20. The control lever 108 has as an input member 106 a plate-like base whose retaining surface is firmly connected to the body 102, e.g. by gluing.

Thus, the retaining member 104 is attached with a retaining surface 46 in a flat manner to the first side 44 of the body 102, and the input member 106 is attached with its retaining surface 50 in an adhering manner to the opposite second side 48 of the body 102. Due to this connection to the device frame 20, the control lever 108 is rotatable about an axis of rotation 39 extending within the body 102. The second hinging point 37 is adjusted in an elastically damped manner by the rotation of the control lever 108 about this axis of rotation 126, while the body 102 is being elastically deformed.

An adjustment of the penetration angles can be brought about, for example, by adjusting the stop 56 or by centrally adjusting a base 64 to which the retaining member is attached. Alternatively or additionally, a length adjusting device 62 for adjusting and fixing a length of the control rod 35 can be provided.

Some aspects are once again summarized in the following: The invention relates to a soil cultivation device (10), which is movable relative to the soil in a direction of movement, for the deep loosening of soils, comprising: perforating tools (32) guided on supporting arms (25) that can be moved up and down, and a damping device (34) having an elastomeric body (102), for damping a returning movement of the perforating tools (32) pivoting relative to the supporting arm during a withdrawal from the soil. In order to enable a smoother and faster operation, it is proposed that a first side (44) of the elastomeric body (102) is connected to a retaining member (104) in a firmly attached manner, resting flat on a retaining surface (46) of the retaining member (104), and that a second side (48) of the elastomeric body (102) opposite the first side (44) is connected to an input member (106) in a firmly attached manner, resting flat on a retaining surface (50) of the input member (106), and/or the body (102) of elastomeric material is elastically biased by means of a separate biasing device (60) acting against the body.

What is claimed is:

1. A soil cultivation device, which is movable relative to the soil in a direction of movement, for the deep loosening of soils, the soil cultivation device comprising:
   a device chassis or device frame;
   at least one supporting arm hinged with a first portion to the device chassis or the device frame so as to be pivotable up and down about a first pivoting axis that is stationary relative to the device chassis or device frame;
   a driving mechanism configured to drive the up-and-down movement of the at least one supporting arm; and
   at least one perforating tool hinging device, respectively, per supporting arm, by which at least one perforating tool is hinged, so as to be pivotable relative to the associated supporting arm about a second pivoting axis, to a second portion of the supporting arm in such a way that the perforating tool is driven into the soil when moving the supporting arm downwards and that the perforating tool hinging device is pivoted relative to the supporting arm and the soil at least when the perforating tool has been driven in and during further movement of the soil cultivation device in the direction of movement, so that the soil can be loosened underneath the soil surface, and at least one gearing mechanism interposed between the perforating tool hinging device and a damping device to at least partially dampen the relative movement between the perforating tool hinging device and the associated supporting arm;
   the damping device having an elastomeric body of an elastomeric material fitted between a retaining member configured to attach the damping device and an input member connected to the gearing mechanism, so that, when a movement is initiated by the gearing mechanism, the retaining member and the input member are able to move while the elastomeric body is being deformed for damping; and
   at least one of the following:
   a first side of the elastomeric body is connected to the retaining member in a firmly attached manner, resting flat on a retaining surface of the retaining member, and that a second side of the elastomeric body opposite the first side is connected to the input member in a firmly attached manner, resting flat on a retaining surface of the input member; and
   the body of elastomeric material is elastically biased by a separate biasing device acting against the body.

2. The soil cultivation device according to claim 1, wherein at least one of the following
   the elastomeric body is a massive block consisting of the elastomeric material; and
   a first surface region of the elastomeric body disposed on the first side of the elastomeric body is connected in an attached manner, firmly and unmovably relative to the retaining member, to a retaining surface of the retaining member, and that a second surface region of the elastomeric body disposed on a second side of the elastomeric body opposite the first side is connected in an attached manner, firmly and unmovably relative to the input member, to a retaining surface of the input member.

3. The soil cultivation device according to claim 1, wherein the surface of the first side is attached in an adhering manner, resting flat against the retaining surface of the retaining member, and that the surface of the second side is attached in an adhering manner, resting flat against the retaining surface of the input member.

4. The soil cultivation device according to claim 1, wherein
the retaining member has a retaining plate or a retaining rail, the input member has an input plate or an input rail, and the body is fitted between the retaining plate or retaining rail on the one hand, and between the input plate or input rail on the other hand, and the retaining plate or retaining rail is attached to the input plate or input rail by the elastomeric body.

5. The soil cultivation device according to claim 1, wherein
the gearing mechanism is connected to the input member in such a way and the retaining member is attached in such a way that the input member and the retaining member rotate relative to one another about an axis of rotation extending through the body when the perforating tool hinging device is pivoted about the second pivoting axis.

6. The soil cultivation device according to claim 5, wherein at least one of the following
the axis of rotation extends parallel to at least one of the retaining surfaces with at least one directional component; and
the body is exposed with those remaining sides that extend parallel to the axis of rotation at least with one directional component and is not laterally supported at these side portions.

7. The soil cultivation device according to claim 1, wherein at least one of the following
the first side rests with its entire surface on the retaining member and is connected over its entire surface to the retaining member;
the second side rests with its entire surface on the input member and is connected over its entire surface to the input member; and
at least one or both of the retaining surfaces being connected over its respective entire surface to the associated side of the body.

8. The soil cultivation device according to claim 1, wherein at least one of the following
the retaining member is attached in a stationary manner relative to the device chassis or the device frame; and
the body is configured in a cuboid shape.

9. The soil cultivation device according to claim 1, wherein
several perforating tool hinging devices are provided that are connected by means of associated gearing mechanisms to respectively associated input members of a common damping device, the damping device having a common retaining member and one or more common elastomeric bodies via which the several input members are connected to the common retaining member.

10. The soil cultivation device according to claim 1, wherein
the gearing mechanism is a linkage system with a control rod hinged in an articulated manner to the perforating tool hinging device with a first hinging point.

11. The soil cultivation device according to claim 10, wherein
the linkage system further has a control lever which is hinged in an articulated manner to the control rod at a second hinging point and is connected to the input member or acts as an input member.

12. The soil cultivation device according to claim 11, wherein at least one of the following
the control lever is attached in an elastically movable manner to the device frame or the device chassis by means of the elastomeric body; and
the retaining member is a control lever base, which is attached to the device frame or the device chassis, and which is attached via the elastomeric body to the control lever in at least one of an elastically movable manner and in an elastically rotatable manner, about an axis of rotation extending through the elastomeric body.

13. The soil cultivation device according to claim 11, wherein at least one of the following
the control lever has a first arm which is firmly connected to the input member for joint movement or forms the input member;
the control lever is rotatable about the axis of rotation extending within the body, while the body is being deformed;
the control lever rests against a stop when the perforating tool has not been driven in;
the control lever has a second arm which rests against the stop when the perforating tool has not been driven in;
the stop is adjustable; and
the stop acts as a biasing device or as a part of the biasing device.

14. The soil cultivation device according to claim 1, wherein at least one of the following
a series of supporting arm with at least one associated penetration tool hinging device each and at least one control rod each is provided, and several or all of the control rods are centrally adjustable in order to adjust a penetration angle;
the at least one control rod is rigid in operation; and
the at least one control rod has a length adjusting device by which the length of the control rod, when not in operation, can be adjusted and fixed for adjusting a penetration angle.

15. The soil cultivation device according to claim 2, wherein
the surface of the first side is attached in an adhering manner, resting flat against the retaining surface of the retaining member, and that the surface of the second side is attached in an adhering manner, resting flat against the retaining surface of the input member.

16. The soil cultivation device according to claim 2, wherein
the retaining member has a retaining plate or a retaining rail, the input member has an input plate or an input rail, and the body is fitted between the retaining plate or retaining rail on the one hand, and between the input plate or input rail on the other hand, and the retaining plate or retaining rail is attached to the input plate or input rail by the elastomeric body.

17. The soil cultivation device according to claim 2, wherein
the gearing mechanism is connected to the input member in such a way and the retaining member is attached in such a way that the input member and the retaining member rotate relative to one another about an axis of rotation extending through the body when the perforating tool hinging device is pivoted about the second pivoting axis.

18. The soil cultivation device according to claim 2, wherein at least one of the following
- the first side rests with its entire surface on the retaining member and is connected over its entire surface to the retaining member;
- the second side rests with its entire surface on the input member and is connected over its entire surface to the input member; and
- at least one or both of the retaining surfaces being connected over its respective entire surface to the associated side of the body.

19. The soil cultivation device according to claim 2, wherein at least one of the following
- the retaining member is attached in a stationary manner relative to the device chassis or the device frame; and
- the body is configured in a cuboid shape.

20. The soil cultivation device according to claim 2, wherein
- several perforating tool hinging devices are provided that are connected by means of associated gearing mechanisms to respectively associated input members of a common damping device, the damping device having a common retaining member and one or more common elastomeric bodies via which the several input members are connected to the common retaining member.

* * * * *